(12) United States Patent
Koerber et al.

(10) Patent No.: US 8,803,352 B1
(45) Date of Patent: Aug. 12, 2014

(54) WIND TURBINES AND METHODS FOR CONTROLLING WIND TURBINE LOADING

(71) Applicant: General Electric Company, Schenectady, NY (US)

(72) Inventors: Arne Koerber, Berlin (DE); William Edwin Holley, Greer, SC (US); Leonardo Cesar Kammer, Niskayuna, NY (US); Charudatta Subhash Mehendale, Niskayuna, NY (US)

(73) Assignee: General Electric Compay, Schenectady, NY (US)

( * ) Notice: Subject to any disclaimer, the term of this patent is extended or adjusted under 35 U.S.C. 154(b) by 0 days.

(21) Appl. No.: 13/893,467

(22) Filed: May 14, 2013

(51) Int. Cl.
*F03D 9/00* (2006.01)
(52) U.S. Cl.
USPC ............................................. 290/44; 290/55
(58) Field of Classification Search
USPC ................................................ 290/43, 44, 55
See application file for complete search history.

(56) References Cited

U.S. PATENT DOCUMENTS

| | | | | |
|---|---|---|---|---|
| 4,703,189 A | * | 10/1987 | DiValentin et al. | 290/44 |
| 5,155,375 A | * | 10/1992 | Holley | 290/44 |
| 5,289,041 A | | 2/1994 | Holley | |
| 7,059,822 B2 | | 6/2006 | LeMieux et al. | |
| 7,351,033 B2 | | 4/2008 | McNerney | |
| 7,420,289 B2 | * | 9/2008 | Wang et al. | 290/44 |
| 7,772,713 B2 | | 8/2010 | Huang et al. | |
| 7,964,979 B2 | | 6/2011 | Miranda et al. | |
| 8,057,174 B2 | * | 11/2011 | Scholte-Wassink | 416/35 |
| 8,131,402 B2 | | 3/2012 | Neumann | |
| 8,487,464 B2 | * | 7/2013 | Skaare et al. | 290/44 |
| 2007/0075546 A1 | | 4/2007 | Avagliano et al. | |
| 2012/0027586 A1 | | 2/2012 | Hoffmann et al. | |

OTHER PUBLICATIONS

Leithead, W.E. and Connor, B. (2000) "Control of variable speed wind turbines: design task", International Journal of Control, 73:13, 1189-1212.
Holley, et al., "Optimal Quasistatic Control of Variable Speed Wind Turbines," European Wind Energy Conference and Exhibition, Jul. 10-13, 1989 (EWEC '89) pp. 341-344.

\* cited by examiner

*Primary Examiner* — Nicholas Ponomarenko
(74) *Attorney, Agent, or Firm* — Dority & Manning, PA (57) ABSTRACT

Wind turbines and methods for controlling wind turbine loading are provided. In one embodiment, a method includes the steps of determining a current wind speed. The method further includes determining a tip speed ratio and a pitch angle that maximize a power coefficient under at least one of the following conditions: a thrust value is less than or equal to a pre-established maximum thrust, a generator speed value is less than or equal to a pre-established maximum generator speed, or a generator torque is less than or equal to a pre-established maximum generator torque. The method further includes calculating a desired generator speed value based on the current wind speed and a tip speed ratio. The method further includes calculating a desired generator power value based on the desired generator speed value.

18 Claims, 4 Drawing Sheets

WIND TURBINES AND METHODS FOR CONTROLLING WIND TURBINE LOADING

FIELD OF THE INVENTION

The present disclosure relates generally to wind turbines, and more particularly to methods for controlling wind turbine loading in wind turbines.

BACKGROUND OF THE INVENTION

Wind power is considered one of the cleanest, most environmentally friendly energy sources presently available, and wind turbines have gained increased attention in this regard. A modern wind turbine typically includes a tower, generator, gearbox, nacelle, and a rotor including one or more rotor blades. The rotor blades capture kinetic energy from wind using known foil principles and transmit the kinetic energy through rotational energy to turn a shaft coupling the rotor blades to a gearbox, or if a gearbox is not used, directly to the generator. The generator then converts the mechanical energy to electrical energy that may be deployed to a utility grid.

During operation of a wind turbine, various components of the wind turbine are subjected to various loads due to the aerodynamic wind loads acting on the blade. In particular, the rotor blades experience significant loading, and frequent changes in loading, during operation due to interaction with the wind. Changes in wind speed and direction, for example, may modify the loads experienced by the rotor blades. To reduce rotor blade loading, various methods and apparatus have been developed to allow the rotor blades to shed a portion of the loads experienced thereby. Such methods and apparatus include, for example, pitching the rotor blades and/or reducing generator torque during operation.

In particular, many wind turbines are designed for a rated wind speed at which maximum thrust and maximum power generation occur. At higher wind speeds than the rated wind speed, the thrust is lower due to pitching of the rotor blades. Many methods are known for determining whether to pitch the rotor blades in order to reduce thrust. Further, many known methods utilize thrust as an explicit input, and output a response based on this input thrust. However, with many such currently known methods for reducing thrust, there is significant lag time between changes in wind speed being experienced by the wind turbine and pitch commands being communicated to the rotor blades. Thus, excessive loading may be experienced by the wind turbine during the lag period. Such excessive loading can weaken and damage the rotor blades, and the wind turbine in general.

Accordingly, improved methods for controlling wind turbine loading are desired in the art. In particular, methods that utilize current wind speeds when determining torque and/or pitch adjustments, and which reduce or eliminate lag time, would be advantageous.

BRIEF DESCRIPTION OF THE INVENTION

Aspects and advantages of the invention will be set forth in part in the following description, or may be obvious from the description, or may be learned through practice of the invention.

In one embodiment, the present disclosure is directed to a method for controlling wind turbine loading. The method includes determining a current wind speed. The method further includes determining a tip speed ratio and a pitch angle that maximize a power coefficient under at least one of the following conditions: a thrust value is less than or equal to a pre-established maximum thrust, a generator speed value is less than or equal to a pre-established maximum generator speed, or a generator torque is less than or equal to a pre-established maximum generator torque. The method further includes calculating a desired generator speed value based on the current wind speed and the tip speed ratio. The method further includes calculating a desired generator power value based on the desired generator speed value.

In another embodiment, the present disclosure is directed to a wind turbine. The wind turbine includes a tower, a nacelle mounted on the tower, a rotor coupled to the nacelle, the rotor comprising a plurality of rotor blades, and a generator positioned within the nacelle. The wind turbine further includes a controller. The controller includes a processor operable to calculate a desired generator speed value based on a current wind speed and a tip speed ratio. The processor is further operable to calculate a desired generator power value based on the desired generator speed value. The processor is further operable to determine the tip speed ratio and a pitch angle that maximize a power coefficient under at least one of the following conditions: a thrust value is less than or equal to a pre-established maximum thrust, a generator speed value is less than or equal to a pre-established maximum generator speed, or a generator torque is less than or equal to a pre-established maximum generator torque.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which.

DETAILED DESCRIPTION OF THE INVENTION

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

Figure 1:
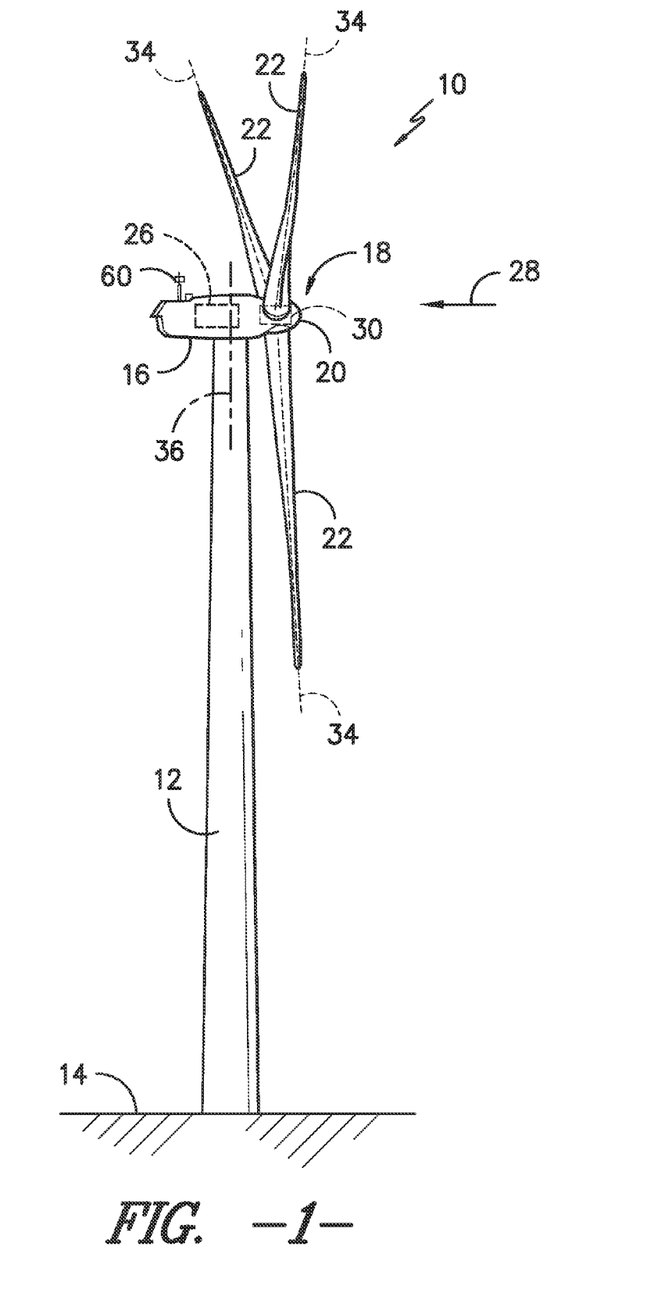
FIG. 1 is a perspective view of a wind turbine according to one embodiment of the present disclosure.

FIG. 1 illustrates a perspective view of one embodiment of a wind turbine 10. As shown, the wind turbine 10 includes a tower 12 extending from a support surface 14, a nacelle 16 mounted on the tower 12, and a rotor 18 coupled to the nacelle 16. The rotor 18 includes a rotatable hub 20 and at least one rotor blade 22 coupled to and extending outwardly from the hub 20. For example, in the illustrated embodiment, the rotor 18 includes three rotor blades 22. However, in an alternative embodiment, the rotor 18 may include more or less than three rotor blades 22. Each rotor blade 22 may be spaced about the hub 20 to facilitate rotating the rotor 18 to enable kinetic energy to be transferred from the wind into usable mechanical energy, and subsequently, electrical energy. For instance, the hub 20 may be rotatably coupled to an electric generator 24 (FIG. 2) positioned within the nacelle 16 to permit electrical energy to be produced.

As shown, the wind turbine 10 may also include a turbine control system or a turbine controller 26 centralized within the nacelle 16. However, it should be appreciated that the turbine controller 26 may be disposed at any location on or in the wind turbine 10, at any location on the support surface 14 or generally at any other location. The turbine controller 26 may generally be configured to control the various operating modes (e.g., start-up or shut-down sequences) and/or components of the wind turbine 10. For example, the controller 26 may be configured to control the blade pitch or pitch angle of each of the rotor blades 22 (i.e., an angle that determines a perspective of the rotor blades 22 with respect to the direction 28 of the wind) to control the loading on the rotor blades 22 by adjusting an angular position of at least one rotor blade 22 relative to the wind. For instance, the turbine controller 26 may control the pitch angle of the rotor blades 22, either individually or simultaneously, by transmitting suitable control signals/commands to various pitch drives or pitch adjustment mechanisms 32 (FIG. 2) of the wind turbine 10. Specifically, the rotor blades 22 may be rotatably mounted to the hub 20 by one or more pitch bearing(s) (not illustrated) such that the pitch angle may be adjusted by rotating the rotor blades 22 about their pitch axes 34 using the pitch adjustment mechanisms 32. Further, as the direction 28 of the wind changes, the turbine controller 26 may be configured to control a yaw direction of the nacelle 16 about a yaw axis 36 to position the rotor blades 22 with respect to the direction 28 of the wind, thereby controlling the loads acting on the wind turbine 10. For example, the turbine controller 26 may be configured to transmit control signals/commands to a yaw drive mechanism 38 (FIG. 2) of the wind turbine 10 such that the nacelle 16 may be rotated about the yaw axis 30.

Still further, the turbine controller 26 may be configured to control the torque of the generator 24. For example, the turbine controller 26 may be configured to transmit control signals/commands to the generator 24 in order to modulate the magnetic flux produced within the generator 24, thus adjusting the torque demand on the generator 24. Such temporary de-rating of the generator 24 may reduce the rotational speed of the rotor blades 22, thereby reducing the aerodynamic loads acting on the blades 22 and the reaction loads on various other wind turbine 10 components.

Figure 3:
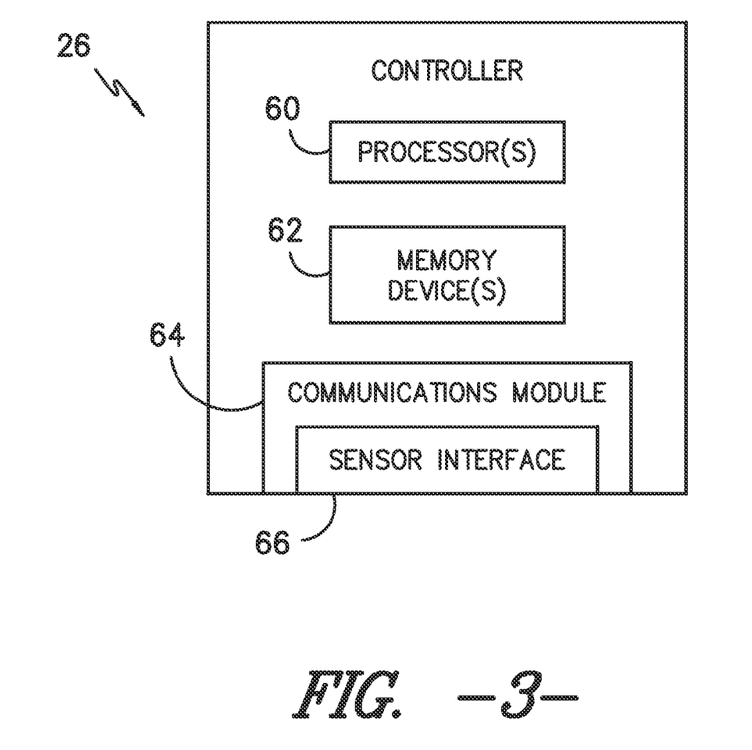
FIG. 3 illustrates a schematic diagram of one embodiment of suitable components that may be included within a controller of a wind turbine.

It should be appreciated that the turbine controller 26 may generally comprise a computer or any other suitable processing unit. Thus, in several embodiments, the turbine controller 26 may include one or more processor(s) and associated memory device(s) configured to perform a variety of computer-implemented functions, as shown in FIG. 3 and discussed herein. As used herein, the term "processor" refers not only to integrated circuits referred to in the art as being included in a computer, but also refers to a controller, a microcontroller, a microcomputer, a programmable logic controller (PLC), an application specific integrated circuit, and other programmable circuits. Additionally, the memory device(s) of the turbine controller 26 may generally comprise memory element(s) including, but are not limited to, computer readable medium (e.g., random access memory (RAM)), computer readable non-volatile medium (e.g., a flash memory), a floppy disk, a compact disc-read only memory (CD-ROM), a magneto-optical disk (MOD), a digital versatile disc (DVD) and/or other suitable memory elements. Such memory device(s) may generally be configured to store suitable computer-readable instructions that, when implemented by the processor(s), configure the controller 26 to perform various computer-implemented functions including, but not limited to, performing proportional integral derivative ("PID") control algorithms, including various calculations within one or more PID control loops, and various other suitable computer-implemented functions. In addition, the turbine controller 26 may also include various input/output channels for receiving inputs from sensors and/or other measurement devices and for sending control signals to various components of the wind turbine 10.

It should additionally be understood that the controller may be a singular controller or include various components, such as pitch controllers and/or yaw controllers, which communicate with a central controller for specifically controlling pitch and yaw as discussed. Additionally, the term "controller" may also encompass a combination of computers, processing units and/or related components in communication with one another.

Figure 2:
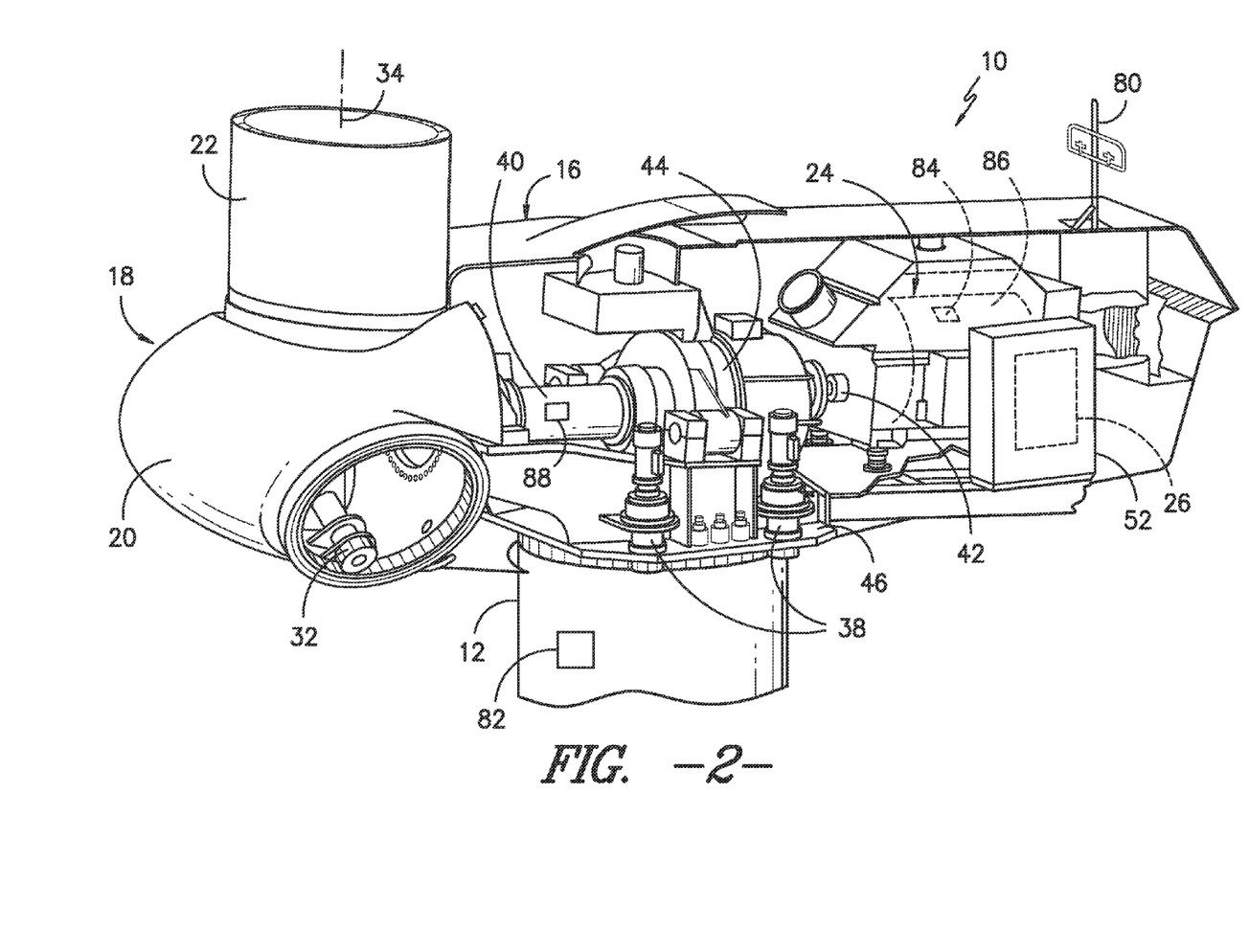
FIG. 2 illustrates a perspective, internal view of a nacelle of a wind turbine according to one embodiment of the present disclosure.

Referring now to FIG. 2, a simplified, internal view of one embodiment of the nacelle 16 of the wind turbine 10 is illustrated. As shown, a generator 24 may be disposed within the nacelle 16. In general, the generator 24 may be coupled to the rotor 18 of the wind turbine 10 for generating electrical power from the rotational energy generated by the rotor 18. For example, the rotor 18 may include a main rotor shaft 40 coupled to the hub 20 for rotation therewith. The generator 24 may then be coupled to the rotor shaft 40 such that rotation of the rotor shaft 40 drives the generator 24. For instance, in the illustrated embodiment, the generator 24 includes a generator shaft 42 rotatably coupled to the rotor shaft 40 through a gearbox 44. However, in other embodiments, it should be appreciated that the generator shaft 42 may be rotatably coupled directly to the rotor shaft 40. Alternatively, the generator 24 may be directly rotatably coupled to the rotor shaft 40 (often referred to as a "direct-drive wind turbine").

It should be appreciated that the rotor shaft 40 may generally be supported within the nacelle by a support frame or bedplate 46 positioned atop the wind turbine tower 12. For example, the rotor shaft 40 may be supported by the bedplate 46 via a pair of pillow blocks 48, 50 mounted to the bedplate 46.

Additionally, as indicated herein, the turbine controller 26 may also be located within the nacelle 16 of the wind turbine 10. For example, as shown in the illustrated embodiment, the turbine controller 26 is disposed within a control cabinet 52 mounted to a portion of the nacelle 16. However, in other embodiments, the turbine controller 26 may be disposed at any other suitable location on and/or within the wind turbine 10 or at any suitable location remote to the wind turbine 10. Moreover, as described herein, the turbine controller 26 may also be communicatively coupled to various components of the wind turbine 10 for generally controlling the wind turbine and/or such components. For example, the turbine controller 26 may be communicatively coupled to the yaw drive mechanism(s) 38 of the wind turbine 10 for controlling and/or altering the yaw direction of the nacelle 16 relative to the direction 28 (FIG. 1) of the wind. Similarly, the turbine controller 26 may also be communicatively coupled to each pitch adjustment mechanism 32 of the wind turbine 10 (one of which is shown) for controlling and/or altering the pitch angle of the rotor blades 22 relative to the direction 28 of the wind. For instance, the turbine controller 26 may be configured to transmit a control signal/command to each pitch adjustment mechanism 32 such that one or more actuators (not shown) of the pitch adjustment mechanism 32 may be utilized to rotate the blades 22 relative to the hub 20.

The present disclosure is further directed to methods for controlling wind turbine 10 loading. In particular, controller 26 may be utilized to perform such methods, and may control torque adjustment of the generator 24 and/or pitch adjustment of the rotor blades 22 based on such methods in order to control loading on the rotor blades 22 and the wind turbine 10 in general. Methods utilized according to the present disclosure advantageously utilize the wind speeds to which the wind turbine 10 is subjected, and may further utilize various pre-determined maximum values for the wind turbine 10, to determine appropriate responses in order to prevent excessive loading. By utilizing such current wind speeds and predetermined maximum values, lag time is significantly reduced, thus reducing potential damage to wind turbines 10 due to excessive wind speeds and gusts, and the resulting excessive thrust loading and blade fatigue that may result therefrom.

Referring now to FIG. 3, there is illustrated a block diagram of one embodiment of suitable components that may be included within the turbine controller 26 in accordance with aspects of the present subject matter. As shown, the controller 26 may include one or more processor(s) 60 and associated memory device(s) 62 configured to perform a variety of computer-implemented functions (e.g., performing the methods, steps, calculations and the like disclosed herein). Additionally, the controller 26 may also include a communications module 64 to facilitate communications between the controller 26 and the various components of the wind turbine 10. For instance, the communications module 64 may serve as an interface to permit the turbine controller 26 to transmit control signals to each pitch adjustment mechanism 32 for controlling the pitch angle of the rotor blades 22. Moreover, the communications module 64 may include a sensor interface 66 (e.g., one or more analog-to-digital converters) to permit input signals transmitted from, for example, various sensor, to be converted into signals that can be understood and processed by the processors 60.

Figure 4:
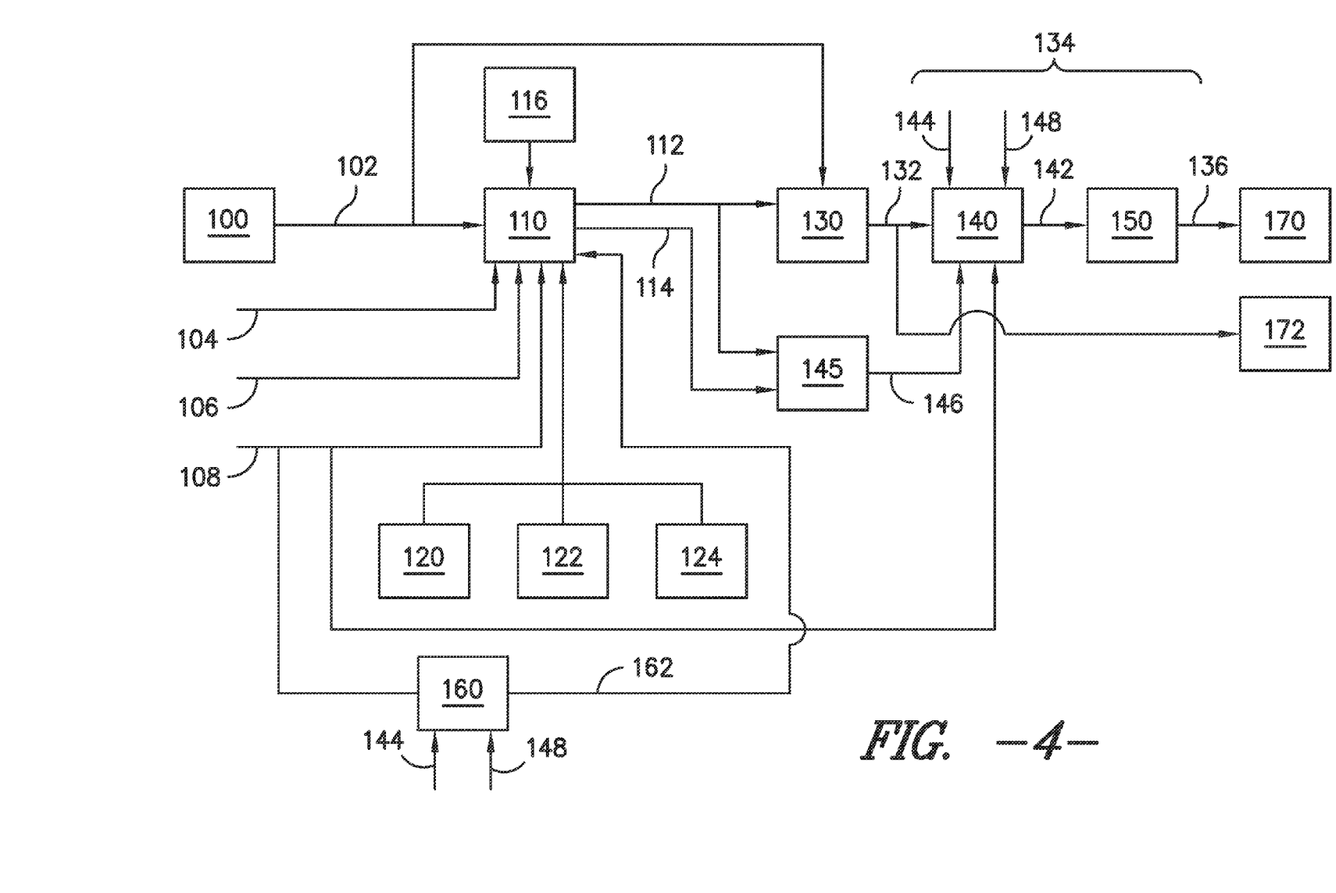
FIG. 4 is a block diagram illustrating a method for controlling wind turbine loading according to one embodiment of the present disclosure.

FIG. 4 illustrate various embodiments of the methods for controlling wind turbine 10 loading according to the present disclosure. It should be understood that methods according to the present disclosure are in exemplary embodiment closed loop feedback methods, and may be utilized with the generator 24 and/or rotor blades 22 of the wind turbine 10 individually or collectively. Methods according to these embodiments may include, for example, the step 100 of determining a current wind speed 102 for the wind turbine 10. The current wind speed 102 is generally the speed of the wind that the wind turbine 10 is currently experiencing. Various methods and apparatus may be utilized for determining a current wind speed 102.

For example, in some embodiments, the current thrust value 102 may be measured. For example, the wind speed of the wind turbine 10 may be measured, such as through use of a suitable weather sensor 80. Suitable weather sensors 80 include, for example, Light Detection and Ranging ("LIDAR") devices, Sonic Detection and Ranging ("SODAR") devices, anemometers, wind vanes, barometers, and radar devices (such as Doppler radar devices). In still other alternative embodiments, sensors 82 may be utilized to measure the deflection of the rotor blades 22. This deflection may be correlated to the wind speed to which the rotor blades 22 are subjected. Still further, any suitable measurement methods and apparatus may be utilized to directly or indirectly measure the current wind speed 102.

In other embodiments, the current wind speed 102 may be estimated. For example, in some embodiments, the wind speed, and changes therein, can be estimated through use of, for example, a wind observer algorithm, which may be included in the controller 26. The wind observer system may input load torque applied to the generator 24, measured by suitable sensors such as sensors 84 on the generator rotor 86 or input shaft, and driving torque applied by the wind, measured by suitable sensors such as sensors 88, and may estimate the wind speed based on these inputs. Alternatively, any suitable methods or apparatus may be utilized to estimate the current wind speed 102.

Methods according to the present disclosure may in some embodiments further include, for example, establishing a maximum thrust 104, a maximum generator speed 106, and a maximum torque. In exemplary embodiments the maximum torque is a maximum generator torque 108, although in alternative embodiments a maximum aerodynamic torque (discussed herein) could be established and the maximum generator torque 108 established through calculation therefrom. Such maximum values are generally pre-established values or ratings which it is generally desirably are not exceeded during operation of the wind turbine 10.

Methods according to the present disclosure may in some embodiments further include, for example, the step 110 of determining a tip speed ratio 112 and a pitch angle 114 that maximize a power coefficient 116 for the wind turbine 10. Tip speed ratio 112 may generally be calculated by multiplying the current rotational speed of the wind turbine 10 (such as the rotor 18 thereof) (measured by suitable sensors in the wind turbine 10) by the maximum radius of the rotor 18, and dividing this result by the wind speed 102. Such determination of a tip speed ratio 112 and a pitch angle 114 that maximize the power coefficient 116 for the wind turbine 10 is generally performed through use of an optimizing algorithm or an iterative search. Such determination may further be performed online, such as on the fly in or by the controller 26, or may be performed offline. An offline solution may involve, for example, the use of a table of pre-computed values, including inputs and outputs, that is stored in the controller 26 and from which the controller 26 selects during operation. Further, such determination may in some embodiments be performed within the constraints of the various pre-established maximum values previously established for the wind turbine 10. For example, in exemplary embodiments, the step 110 of determining the tip speed ratio 112 and the pitch angle 114 that maximize the power coefficient is performed under the condition 120 that a thrust value be less than or equal to the pre-established maximum thrust 104, the condition 122 that a generator speed value be less than or equal to the pre-established maximum generator speed 106, and/or the condition 124 that a generator torque be less than or equal to a pre-established maximum generator torque 108. Thus, under these conditions, these values will generally not exceed the pre-established maximum values when the tip speed ratio 112 and the pitch angle 114 are not exceeded, and the tip speed ratio 112 and the pitch angle 114 may maximize the power coefficient for these conditions.

In some embodiments, methods according to the present disclosure may further include the step 160 of calculating a maximum aerodynamic torque 162. For example, if a maximum aerodynamic torque 162 is not initially established, the maximum aerodynamic torque 162 may be calculated based on, for example, the pre-established maximum generator torque 108, an efficiency value 144, and a gearbox ratio 148. The efficiency value 144 may generally be an efficiency at which it is desired that the wind turbine 10 operate or at which the wind turbine 10 is operating. The efficiency value 144 may be an exact or approximate value, and may for example be modeled for various operating points of the wind turbine 10. The gearbox ratio 148 may be the ratio between the input and output of the gearbox 44. The maximum aerodynamic torque 162 may be calculated by, for example, multiplying the maximum generator torque 108 by the efficiency value 144, and dividing this resulting value by the gearbox ratio 148. In some embodiments, the maximum aerodynamic torque 162 may be utilized during the determination 110 of the tip speed ratio 112 and the pitch angle 114 that maximize the power coefficient 116. For example, in some embodiments, the determination 110 may be performed under the condition that an aerodynamic torque be less than or equal to the maximum aerodynamic torque 162, which may be pre-established or calculated as discussed.

Methods according to the present disclosure advantageously provide for the calculation of various generator 24 values, which may be based on the current wind speed 102 and various other values. For example, a method may include the step 130 of calculating a desired generator speed value 132 based on the current wind speed 102. The desired generator speed value 132 is generally a generator speed set point. Advantageously, by setting the generator speed to this calculated set point, various other wind turbine 10 values may fall within the pre-established and/or maximum values therefor as discussed herein. Various other suitable values may additionally be utilized to calculate the desired generator speed value 132. For example, in some exemplary embodiments, such calculation may further utilize the tip speed ratio 112. In further exemplary embodiments, such calculation may further utilize the gearbox ratio 148. For example, desired generator speed value 132 may be calculated by multiplying the tip speed ratio 112 by the current wind speed 102, and multiplying this result by the gearbox ratio 148. Additionally or alternatively, in some embodiments, current air density may be utilized in such calculation. It should additionally be understood that such calculation of a desired generator speed value 132 may be performed as an online calculation or an offline calculation, as discussed herein. Such calculation may provide a desired generator speed value 132 for the current wind speed 102 which may advantageously constrain the wind turbine 10 to within various herein disclosed maximum values.

Further, a method according to the present disclosure may include the step 134 of calculating a desired generator power value 136 based on the desired generator speed value 132. The desired generator power value 136 is generally a generator power set point. Advantageously, by setting the generator power to this calculated set point, various other wind turbine 10 values may fall within the pre-established and/or maximum values therefor as discussed herein. Various other suitable values may additionally be utilized to calculate the desired generator power value 136. For example, in exemplary embodiments, as shown, such step 134 may be performed by performing the step 140 of calculating a desired generator torque value 142, and then performing the step 150 of utilizing the desired generator torque value 142 and the desired generator speed value 132 to calculate the desired generator power value 136. For example, the desired generator power value 136 may be calculated by multiplying the desired generator torque value 142 and the desired generator speed value 132 together.

In some embodiments, the desired generator torque value 142 may be a value based on the efficiency value 144, the gearbox ratio 148, and an aerodynamic torque value 146 calculated at the tip speed ratio 112 and the pitch angle 114. Such methods may thus include the step 145 of calculating the aerodynamic torque value 146 at the tip speed ratio 112 and the pitch angle 114. The desired generator torque value 142 may thus, for example, be calculated by multiplying the efficiency value 144 by the aerodynamic torque value 146 and dividing the result by the gearbox ratio 148. In other embodiments, the desired generator torque value 142 may be the maximum generator torque 108. Still further, in exemplary embodiments, the desired generator torque value 142 may be a minimum value of the maximum generator torque 108 and the value based on the efficiency value 144, the gearbox ratio 148, and the aerodynamic torque value 146. Thus, in these embodiments whichever value, the maximum generator torque 108 or the value based on the efficiency value 144, the gearbox ratio 148, and the aerodynamic torque value 146, is less will be utilized as the desired generator torque value 142.

As discussed, according to step 134, the desired generator power value 136 may be calculated based on the desired generator speed value 132. It should additionally be understood that such calculation of a desired generator power value 136 may be performed as an online calculation or an offline calculation, as discussed herein. Such calculation may provide a desired generator power value 136 for the current wind speed 102 which may advantageously constrain the wind turbine 10 to within various herein disclosed maximum values.

Thus, the desired generator speed value 132 and the desired generator power value 136 may be calculated in accordance with the present disclosure. In further exemplary embodiments, these set points may further be utilized in adjustments to various components of the wind turbine 10. For example, in some embodiments, a method according to the present disclosure may further include the step 170 of adjusting a torque of the generator 24 such that a power output of the generator 24 is adjusted towards the desired generator power value 136. Further, in exemplary embodiments, the torque is adjusted until the power output is approximately equal to the desired generator power value 136. The generator 24 torque may, for example, be adjusted through modulation of the magnetic flux by the controller 26, as discussed herein.

Additionally or alternatively, in some exemplary embodiments, a method according to the present disclosure may further include the step 172 of adjusting the pitch of at least one of the plurality of rotor blades 22 of the wind turbine 10 such that the speed of the generator 24 is adjusted towards the desired generator speed value 132. Further, in exemplary embodiments, the pitch is adjusted until the speed is approximately equal to the desired generator speed value 132. Such pitching of the rotor blades 22 may, for example, be performed through operation of the controller 26 and pitch adjustment mechanisms 32, as discussed herein.

Alternatively, in some embodiments wherein the tip speed ratio 112 and the pitch angle 114 that maximize the power coefficient 116 are calculated, the pitch of one or more rotor blades 22 may be adjusted to the pitch angle 114 rather than being based on the desired generator speed value 132 as discussed herein. Thus, a method according to the present disclosure may include adjusting a pitch of at least one of the plurality of rotor blades 22 of the wind turbine 10 to the pitch angle 114.

It should be understood that such adjustments of the generator 24 torque and rotor blade 22 pitch according to the present disclosure are in exemplary embodiments performed through a controller, such as controller 26, acting on the difference between a current value, such as a current torque or pitch value, and the calculated set point value as discussed herein. Additionally, it should be understood that such adjustments may be performed separately or together in, for example, a multi-input-multi-output ("MIMO") controller (which may be or be part of controller 26).

The present disclosure is further directed to wind turbines 10 and controllers 26 of the wind turbines 10. As discussed, a controller 26 according to the present disclosure may be configured to perform the various methods and steps thereof disclosed herein. For example, a controller 26 according to the present disclosure may include a processor 60 operable to calculate a desired generator speed value 132 based on a current wind speed 102, as discussed herein. The processor 60 may further be operable to calculate a desired generator power value 136 based on the desired generator speed value 132, as discussed herein.

Additionally, as discussed herein, processor 60 may be operable to, for example, establish various pre-established values, such as a maximum thrust 104, a maximum generator speed 104, and a maximum torque. The processor 60 may further be operable to, for example, determine a tip speed ratio 112 and a pitch angle 114 that maximize a power coefficient 116, as discussed herein.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A method for controlling wind turbine loading, the method comprising:
   determining a current wind speed;
   determining a tip speed ratio and a pitch angle that maximize a power coefficient under at least one of the following conditions:
      a thrust value is less than or equal to a pre-established maximum thrust;
      a generator speed value is less than or equal to a pre-established maximum generator speed; or
      a generator torque is less than or equal to a pre-established maximum generator torque;
   calculating a desired generator speed value based on the current wind speed and the tip speed ratio; and
   calculating a desired generator power value based on the desired generator speed value.

2. The method of claim 1, further comprising adjusting a torque of the generator such that a power output of the generator is adjusted towards the desired generator power value.

3. The method of claim 1, further comprising adjusting a pitch of at least one of a plurality of rotor blades of the wind turbine such that a speed of the generator is adjusted towards the desired generator speed value.

4. The method of claim 1, further comprising adjusting a pitch of at least one of the plurality of rotor blades of the wind turbine to the pitch angle.

5. The method of claim 1, wherein the step of determining the tip speed ratio and the pitch angle that maximize the power coefficient is performed under the conditions that a thrust value is less than or equal to a pre-established maximum thrust, a generator speed value is less than or equal to a pre-established maximum generator speed, and a generator torque is less than or equal to a pre-established maximum generator torque.

6. The method of claim 1, further comprising establishing a maximum generator torque, and further comprising calculating a maximum aerodynamic torque based on the maximum generator torque, an efficiency value, and a gearbox ratio.

7. The method of claim 1, wherein the step of calculating a desired generator power value comprises calculating a desired generator torque value, and utilizing the desired generator torque value and the desired generator speed value to calculate the desired generator power value.

8. The method of claim 7, wherein the desired generator torque value is a minimum value of a pre-established maximum generator torque and a value based on an efficiency value, an aerodynamic torque value at a tip speed ratio and a pitch angle that maximize a power coefficient, and a gearbox ratio.

9. The method of claim 1, wherein the current wind speed is a measured.

10. The method of claim 1, wherein the current wind speed is estimated.

11. A wind turbine, comprising:
    a tower;
    a nacelle mounted on the tower;
    a rotor coupled to the nacelle, the rotor comprising a plurality of rotor blades;
    a generator positioned within the nacelle; and
    a controller, the controller comprising a processor operable to calculate a desired generator speed value based on a current wind speed and a tip speed ratio and calculate a desired generator power value based on the desired generator speed value, the processor further operable to determine the tip speed ratio and a pitch angle that maximize a power coefficient under at least one of the following conditions:
       a thrust value is less than or equal to a pre-established maximum thrust;
       a generator speed value is less than or equal to a pre-established maximum generator speed; or
       a generator torque is less than or equal to a pre-established maximum generator torque.

12. The wind turbine of claim 11, wherein the processor is further operable to adjust a torque of the generator such that a power output of the generator is adjusted towards the desired generator power value.

13. The wind turbine of claim 11, wherein the processor is further operable to adjust a pitch of at least one of a plurality of rotor blades of the wind turbine such that a speed of the generator is adjusted towards the desired generator speed value.

14. The wind turbine of claim 11, wherein the processor is further operable to calculate a maximum aerodynamic torque based on a pre-established maximum generator torque, an efficiency value, and a gearbox ratio.

15. The wind turbine of claim 11, wherein the processor is further operable to calculate a desired generator torque value and utilize the desired generator torque value and the desired generator speed value to calculate the desired generator power value.

16. The wind turbine of claim 15, wherein the desired generator torque value is a minimum value of a pre-established maximum generator torque or a value based on an efficiency value, an aerodynamic torque value at a tip speed ratio and a pitch angle that maximize a power coefficient, and a gearbox ratio.

17. The wind turbine of claim 11, wherein operation of the processor to determine the tip speed ratio and the pitch angle that maximize the power coefficient is performed under the conditions that a thrust value is less than or equal to a pre-established maximum thrust, a generator speed value is less than or equal to a pre-established maximum generator speed, and a generator torque is less than or equal to a pre-established maximum generator torque.

18. The wind turbine of claim 11, further comprising a sensor operable to determine the current wind speed.

* * * * *

UNITED STATES PATENT AND TRADEMARK OFFICE
CERTIFICATE OF CORRECTION

| | | |
|---|---|---|
| PATENT NO. | : 8,803,352 B1 | |
| APPLICATION NO. | : 13/893467 | |
| DATED | : August 12, 2014 | |
| INVENTOR(S) | : Arne Koerber et al. | |

It is certified that error appears in the above-identified patent and that said Letters Patent is hereby corrected as shown below:

In Column 10, line 27: Please delete the "a" in "…is a measured." It should read "…is measured."

Signed and Sealed this
Fifth Day of April, 2016

Michelle K. Lee
*Director of the United States Patent and Trademark Office*